Figure 1:
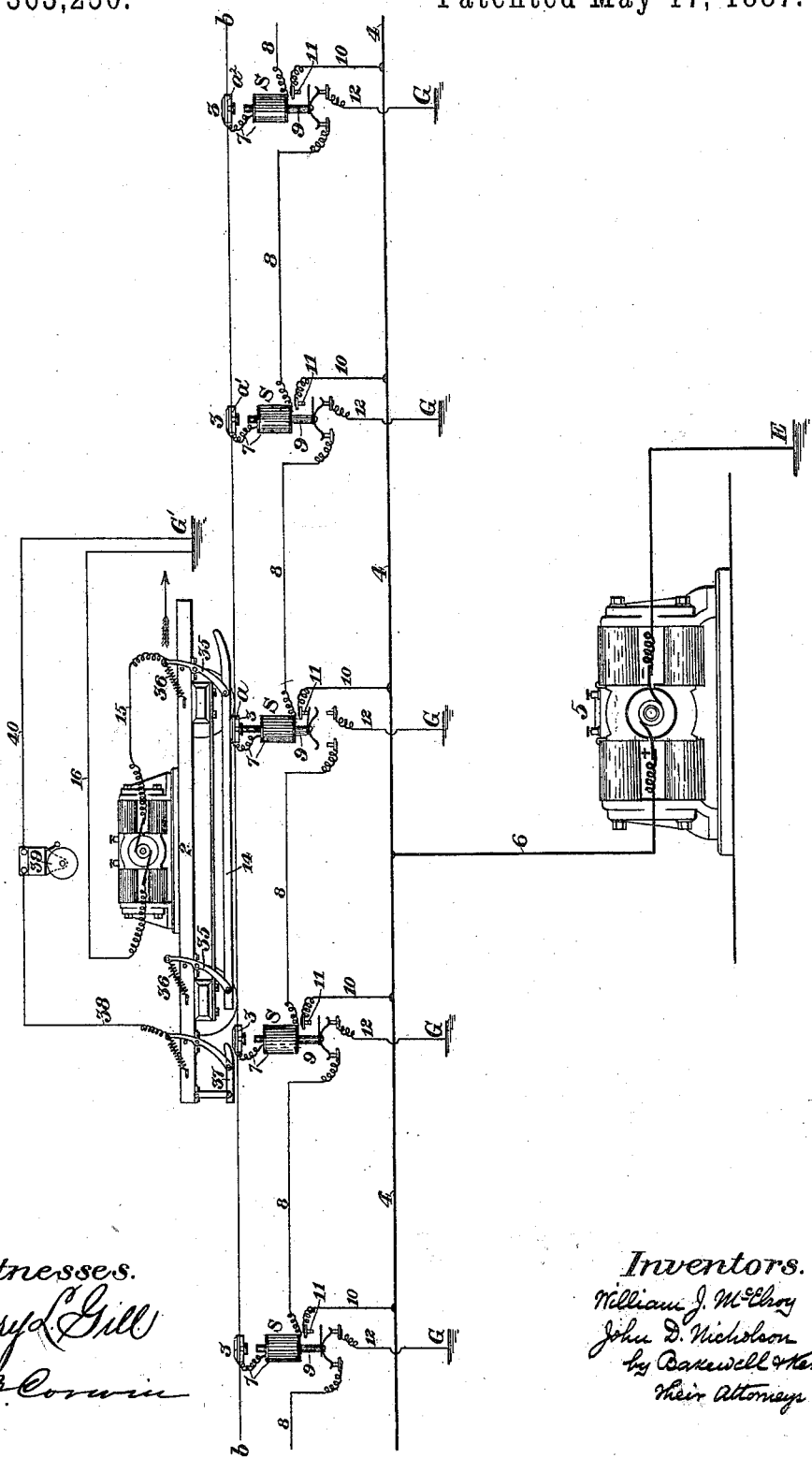

(No Model.) 3 Sheets—Sheet 1.

W. J. McELROY & J. D. NICHOLSON.
SYSTEM OF ELECTRICAL DISTRIBUTION FOR RAILWAYS.

No. 363,250. Patented May 17, 1887.

Witnesses.
Harry L. Gill
W. B. Corwin

Inventors.
William J. McElroy
John D. Nicholson
by Bakewell & Kerr
their Attorneys (No Model.) 3 Sheets—Sheet 2.

W. J. McELROY & J. D. NICHOLSON.
SYSTEM OF ELECTRICAL DISTRIBUTION FOR RAILWAYS.

No. 363,250. Patented May 17, 1887.

Witnesses.

Inventors.

(No Model.) 3 Sheets—Sheet 3.
W. J. McELROY & J. D. NICHOLSON.
SYSTEM OF ELECTRICAL DISTRIBUTION FOR RAILWAYS.
No. 363,250. Patented May 17, 1887.
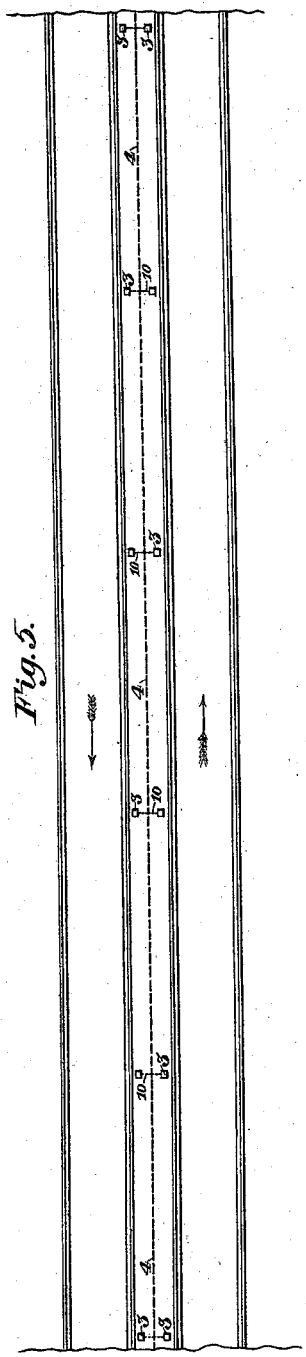
Witnesses.
Harry L. Gill
W. B. Corwin
Inventors.
William J. McElroy
John D. Nicholson
by Bakewell & Kerr
Their Attorneys

UNITED STATES PATENT OFFICE.

WILLIAM J. McELROY, OF PITTSBURG, AND JOHN D. NICHOLSON, OF ALLEGHENY CITY, PENNSYLVANIA.

SYSTEM OF ELECTRICAL DISTRIBUTION FOR RAILWAYS.

SPECIFICATION forming part of Letters Patent No. 363,250, dated May 17, 1887.

Application filed September 27, 1886. Serial No. 214,590. (No model.)

*To all whom it may concern:*

Be it known that we, WILLIAM J. MCELROY, of Pittsburg, and JOHN D. NICHOLSON, of Allegheny City, in the county of Allegheny and State of Pennsylvania, have invented a new and useful Improvement in Systems of Electrical Distribution for Railways; and we do hereby declare the following to be a full, clear, and exact description thereof.

Various systems of electrical distribution for railways have heretofore been employed or proposed for supplying the electromotor on the car or vehicle with current as it travels. In one the conductor is a continuous uncovered wire arranged overhead on poles, the electrical connection with the motors being made by travelers which ride on the conductors and lead to the motors. Another method is to utilize the metallic rails of the track as the conductors. Another arrangement is to place the conductors in underground conduits beneath the track and to make connection therewith by contact devices or shoes which ride on the conductors and extend to the motors through a slot in the conduit. A fourth method has been proposed, wherein the positive and negative mains are insulated and buried alongside the rails with upwardly-extending branches at intervals exposed at the surface, forming alongside the track a double series of contact-pins charged at all times with the normal potential of the conductors. In this case the motor-car is provided on each side with a blade long enough to extend to and cover two such contact-pins at each side, the current passing from the positive main directly into the pin or pins and blade on that side, thence to the electromotor, whence it goes to the negative main directly through the blade and pin or pins on the other side. A fifth method contemplates, under various modifications by different inventors, the use of exposed surface conductors or rails, certain lengths of such conductors or rails forming sections, which sections are successively connected to and cut off from electrical connection with the main conductor by various applications of electro-magnetic devices.

The overhead conductors have been found to be subject to serious disadvantages, both because of their unsightliness and because of the danger to human life resulting from the presence of such highly-charged and exposed electrical conductors, particularly so when they are in the proximity of the wires of telegraph or telephone systems. It is difficult to preserve the insulation of the continuous conductors, and generally the same objections as to public convenience which have been urged against overhead telegraph and telephone wires are applicable in a greater degree to the conductors of electrical railways when similarly arranged. Many of these objections are incident to the use of the rails as conductors.

The chief objections to the use of the underground conduit are the large first cost of construction and the difficulty of placing an uncovered electrical conductor for currents of high potential below the surface and maintaining thereon the degree of insulation necessary for the economic operation of the system. Sewerage must be provided to carry off the surface-drainage which comes through the slot, and these sewers are apt to become filled with backwater in times of flood and to submerge the conductors.

In all of the above-mentioned systems involving the use of insulated main conductors with means for conveying the current to exposed surface-conductors and the electromotor on the car when such system is applied to surface railways the conditions described are necessarily such as to make it possible for foot-passengers, horses, and other animals to receive the current and be injured thereby while crossing the track either before or behind the motor-car; and in such systems there is always danger more or less imminent of short-circuiting the exposed surface-conductors while charged with current, and thereby either destroying the generator or compelling a stoppage of traffic on the entire line.

The object of our invention is to overcome these objections and to limit the possibility of leakage to an absolute minimum; and it consists of a main conductor of insulated wire, preferably buried in the earth, with lateral branches at proper intervals connecting said prime conductor with insulated contact devices at the surface arranged at suitable intervals along the railway, said devices being in the form of contact points or spots as distinguished from one or more lengths of rail or conductors, with means interposed in the said lateral branches of making and breaking the electrical connection between the buried conductor and the contact-spots, and so arranged that the surface plates or conductors are charged with electricity only at such times as may be necessary to allow the passing car to receive the current, the contact-spots being at all other times disconnected from the prime conductor, and hence safe for ordinary travel.

Our invention also consists in other details, which we shall describe, and shall specifically indicate in the claims.

Figure 2:
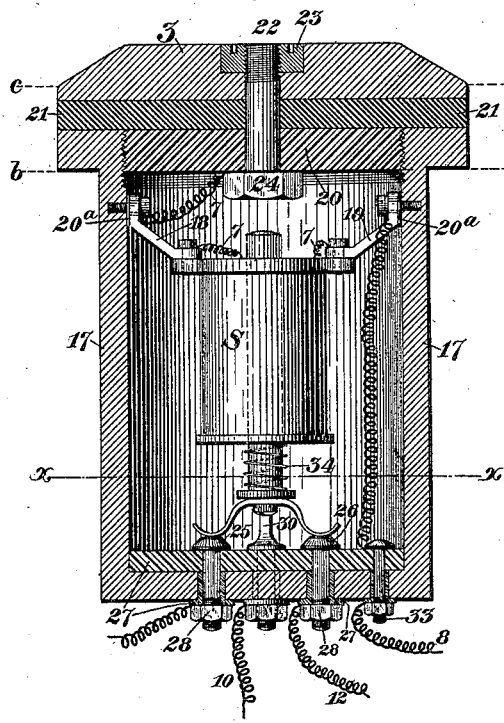
Figure 3:
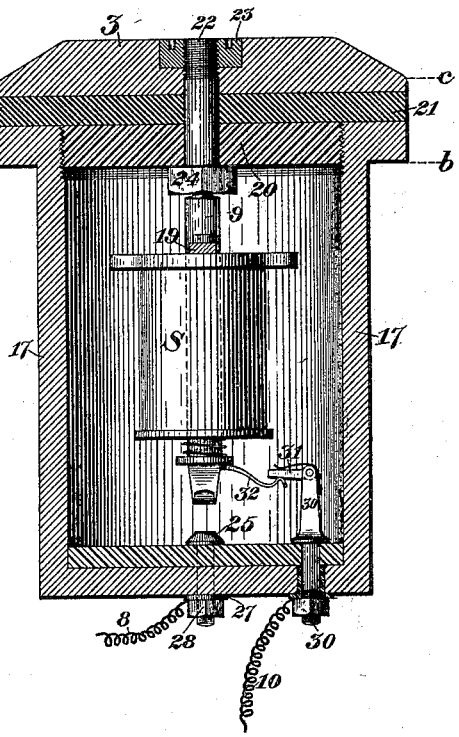
Figure 4:
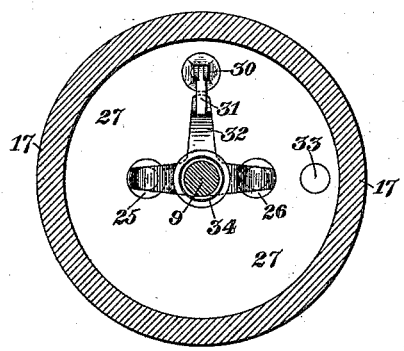

In the accompanying drawings, Figure 1 is a diagram-view illustrating our invention. Fig. 2 is a vertical axial section of the box containing the electrical apparatus which automatically connects and disconnects the contact-spots with and from the main conductor. Fig. 3 is a view similar to Fig. 2, except that the section-plane is at right angles to the section-plane of that figure, thus presenting a side view of the contents of the box. Fig. 4 is a horizontal cross-section on the line $xx$ of Fig. 2. Fig. 5 is a plan view showing the position of the contact-spots relative to the track.

Like symbols of reference indicate like parts in each.

In the drawings, Fig. 1, $b\ b$ represent the line of the railway-track, and 2 is the motor-car on the track. At intervals along the track are metallic plates 3, which project above the surface of the ground. These are the contact-spots of the system, and are preferably separated from each other by a space about equal to the length of the car; and we wish here to remark that these small "contact-spots," as we term them, form one of the characteristic and distinguishing features of our invention. We shall describe the construction of these plates and of the other parts of the system more in detail hereinafter, and shall first give only a general description of the system.

4 is the line-conductor of the system, which is insulated and is preferably buried underground near to and parallel with the track. The electrical generator 5 is an ordinary power-driven dynamo-machine, and, for the purpose of economical distribution, is preferably situated about at the middle of the line-conductor, and one of its poles, $+$, is connected therewith by a conductor, 6. The other pole, $-$, of the generator is grounded, as at E. Underneath the several contact-spots 3 are solenoid magnets S, set in closed boxes. Each consists of a coil, 7, of wire wound in the usual way around a hollow spool, one end of the coil being electrically connected with the contact-spot 3, while the other end of the coil, through a wire, 8, extends to a position directly beneath the core of the next succeeding magnet. The armature or core 9 of each solenoid is a bar, the upper half of which is of brass or other non-magnetic metal, and the lower half is soft iron.

10 are lateral branch conductors which extend from the line-conductor into the boxes containing the solenoids S. Each ends in a terminal contact-point, 11, which is arranged to make contact with the core 9 of the solenoid when the latter rises in its helix, as hereinafter to be described. Beneath the core 9 in each box are the terminals of conductors 8 and 12, which are arranged to make contact with the core when it drops in its helix. The wire 8 has before been described. The wire 12 is grounded at G.

As shown in Fig. 1, the motor-car is provided with a horizontal contact-bar, 14, which is of length equal to or greater than the distance between two adjacent contact-spots 3, and is arranged to make contact therewith as the car passes. This contact-bar is electrically connected with one of the armature-poles of the motor by a conductor, 15, the other pole of the motor being grounded by a conductor, 16, which is in electrical communication with one of the car-wheels, through which the current passes to the earth.

As thus described, the operation of the system is as follows: Suppose that, as shown in Fig. 1, the contact-bar 14 of the motor is in contact with the plate 3 which is marked $a$ and that the core 9 of the magnet S under that plate is elevated so as to be in contact therewith. Then, as before stated, the armature or core 9 will also be in contact with the terminal 11 of the conductor 10. The core 9 of the solenoid under the next plate at $a'$ is, however, down and in contact with the terminals of its conductors 8 and 12. Then the course of the electrical current of the generator is from pole $+$ of the latter through main conductor 4 to conductor 10 nearest to the plate 3 at $a$, thence through this conductor 10, terminal 11, and core 9 to the contact-plate at $a$, whence, through bar 14 and conductor 15, it traverses the motor, and finally through the conductor 16 to earth, where it reaches the $-$ pole of the generator at E, thus completing the circuit. The current will thus excite and drive the motor, causing the car to travel on the track in the direction of the arrow A. A portion of the current, however, will be shunted from the contact-spot at $a$ through the helix 7 and through wire 8 to the solenoid-core 9 under the spot at $a'$, whence, by wire 12, it goes to ground at G and completes the circuit. This derived current, which obviously flows around the motor in parallel circuit, excites the solenoid S under the spot at $a$, and, by reason of the fact that the upper part of the solenoid-core is of brass or other non-magnetic metal, while the lower part is of iron, the current keeps the bar raised and in contact with the plate 3 at $a$. When, as the car moves forward, the contact-bar 14 engages the plate 3 at $a'$, a portion of the current will be shunted from the bar through this plate 3, its coil 7, wire 8, and core 9 under the plate at $a^2$, through wire 12 to ground, thus exciting the solenoid S under plate 3 at $a'$, and raising its core into contact with its plate 3, and establishing the circuit from the generator through the solenoid-core and plate 3 at $a'$ to the motor. The very act of rising of this core breaks the connection of the wire 8 from solenoid under $a$ with the wire 12 under $a'$, and thus by breaking the derived circuit through the solenoid under $a$, and by demagnetizing the latter, its core 9 will drop and will free itself from the contact-spot at $a$ and from the terminal 11 of the conductor 10. This breaks the circuit from the generator through the contact-spot at $a$ to the motor; but, because of the previous engagement of the forward end of the contact-bar 14 with the contact-spot 3 at $a'$, there will be no interruption of the current to and through the motor. So, when the front end of the contact-bar 14 reaches the contact-spot 3 at $a^2$, the solenoid-core there will rise and will cut off the circuit through the plate 3 at $a'$, and will establish the circuit through the spot at $a^2$, and so on. In this way only the contact-spots directly beneath the car are in circuit with the generator, the other spots, both in front and behind the car, being altogether disconnected therefrom. Possibility of shock from touching the contact-spots is thus avoided. As the main conductor 4 is insulated and its exposed charged connections are those which are under the several motors on the road, and for the same reason, the loss of electricity from imperfect insulation is reduced to an absolute minimum.

We shall now describe in detail the preferable construction of the parts of the system.

Referring to Fig. 2, the line $b\,b$ indicates the surface of the ground, or the parts may be so lowered that the line $c\,c$ shall be the surface-line. The solenoid S is set in a box, 17, which is of any size or shape found suitable to the particular circumstances of use. This box is set under the surface of the roadway, and is preferably built in with masonry to keep it steady. The solenoid S is held in the box 17 by lateral arms 18 and 19, which are insulated from the sides of the box by insulating material, $20^a$. The bars 18 and 19 are also connected with the helix of the solenoid and connect the latter with the wires 7 and 8.

20 is a plate of hard rubber or other insulating material which is screwed into the upper part of the box 17 and covers it. This is preferably covered by a sheet of soft rubber or other elastic substance, 21, which is interposed between the box and the top contact-plate 3, not only for the purpose of better insulating the latter, but also to give a certain resiliency to the plate. The plate 3 which is on the surface is metallic, and is connected with the box by a bolt, 22, which passes through the parts 3, 21, and 20, and is held to the plate 3 by a nut, 23, which screws into a countersunk hole in the latter. The wire 7 is attached to the head 24 of the bolt 22 on the under side of the plate 20, and the connection between the plate 3 and the solenoid-core 9 is made by the engagement of the latter with the head of the bolt. On the bottom of the box are binding posts or bolts 25 and 26, which pass through the bottom, and are secured thereto by nuts 28. These posts are insulated from the box by insulation 27, and form the terminals of the conductor 12 and the conductor 8 from the next preceding box. On the lower end of the solenoid core or bar 9 is secured a plate having three arms, two of which are adapted to engage the posts 25 and 26 when the core drops.

30 is the screw-post to which is attached the conductor 10 from the line-conductor 4. It projects into the box and has at its end a horizontal arm, 31, Fig. 3, which is hinged, so as to be movable upward. The arm 32 on the core 9 is arranged to engage the arm 31 when the core rises, the purpose of the hinge-joint being to avoid the necessity for accurately fixing the parts to cause the core to engage the part 24 and the arm 31 at the same moment.

33 is the post (constructed like the others) to which the conductor 8 from the arm 19 is attached, and from which its continuation leads to the post 25 in the next succeeding box.

In order that the core-bar 9 may certainly drop when the exciting-circuit of the solenoid is broken, we employ a spring, 34, which encircles the core within the spool of the solenoid and exerts a downward pressure thereon.

Thus arranged, it will be seen that the box 17 may be made quite small and tight, so as to perfectly exclude moisture, both at the surface and at the bottom and sides, the only part of the apparatus necessarily exposed being the surface contact-spot 3. The conductors 4, 8, 10, and 12 may all be enveloped by an insulating covering. This construction, by avoiding many of the evils indicated in the first part of this specification, is of great merit in enhancing the advantages of our improved system.

In Fig. 1 we show in detail the arrangement of the contact-bar 14 on the motor-car. It consists of a horizontal metallic bar supported by lever-arms 35 to the bottom of the car, which lever-arms are acted on by springs 36, which tend to move the bar downward. The front end of the bar is curved upward to prevent it being broken when it engages the contact-spot 3. The main purpose of the springs 36 and arms 35 is to cause the bar to bear upon the contact-spots as the car passes over them; but we have shown one of the arms 35 electrically connected with the motor by a wire, 15, so that the arm also serves as part of the conductor, conveying the electricity to the motor from the bar 14.

In Figs. 2 and 3 we have shown a spring, 34, for drawing the core-bar 9 of the solenoid down from connection with the contact-plate 3 after the motor has passed, so as to break the circuit between the generator and the contact. As an added safety appliance in case, for any reason, the solenoid-bar should stick and should not break the circuit, we have devised means for indicating such an accident to the engineer on the car. This is shown in Fig. 1.

37 is a contact shoe or bar arranged under the car behind the bar 14 and connected by a wire, 38, with one pole of an electric bell, 39, the other pole of which, by a wire, 40, connected with a wheel of the car, is grounded, as indicated at G'. If, for any cause, the solenoid-core 9 should not drop after the rear end of the bar 14 has passed its contact-spot 3, so that the spot is still in circuit with the generator, the subsequent engagement of the shoe 37 with the spot will complete the circuit through wire 38, bell 39, and ground-wire 40 to generator, and will ring the bell, thus indicating to the engineer that the parts of the solenoid are out of order.

In our system, as hereinbefore described, the earth is employed as the return-conductor from the motor to the generator-dynamo; but, if desired, an ordinary metal conductor may be so used, and the principles of open circuits automatically closed through the motor by passage of the car can, when desirable, be extended to both the main conductors. Ordinarily we deem this duplication of our improvement to be unnecessary, but it may be found advisable in some cases.

We do not limit ourselves strictly to the arrangement of the mechanism which we have shown and described, especially as regards the arrangement of the conductor and contact-plates with reference to the surface of the roadway and the peculiar form of magnets S, since these may be modified by the skilled electrician, the essential and novel characteristic of our invention being the continuous supply of current to the moving car and its motor through the medium of contact-spots which even themselves are not charged with potential at any time, except while the car is directly over them, and therefore in a position to prevent all accidental access thereto.

We claim as our invention—

1. In a system of electrical distribution for railways, an insulated main conductor, in combination with a series of insulated contact-spots rigidly fixed and distributed apart along the surface, normally disconnected from the main conductor and adapted to temporary connection therewith only while the motor-car is passing, a motor-car, and a contact-bar carried by said car and adapted to span and touch two of said spots simultaneously.

2. In a system of electrical distribution for railways, the combination of an insulated main conductor, a series of insulated contact-spots rigidly fixed and distributed apart along the surface and normally disconnected from the main conductor, and suitable means for connecting each of the said spots in turn with the main conductor, dependent for operation solely upon the presence of the car over such spot.

3. In a system of electrical distribution for railways, the combination of an insulated main conductor, a series of insulated contact-spots distributed apart along the surface and normally disconnected from the main conductor, and inaccessible electro-magnetic switching devices for connecting each of said spots in turn with the main conductor as the motor advances.

4. In a system of electrical distribution for railways, the combination of an insulated main conductor, a series of insulated contact-spots distributed apart along the surface and normally disconnected from the main conductor, electro-magnetic switching devices for connecting each of said spots in turn with the main conductor, and a traveling motor carrying a contact-bar adapted to span and make contact with two of said contact-spots, and arranged for operation substantially as described.

5. The herein-described system of electrical distribution for railways, comprising an insulated main conductor and a return-conductor normally disconnected therefrom, a series of insulated contact-spots distributed apart along the surface and normally disconnected from said main conductor, a traveling electromotor having one pole constantly connected to the said return-conductor and the other pole to a contact-bar adapted to span and touch two of said spots, and suitable electro-magnetic switching devices adapted to connect the main conductor with said spots and dependent for operation on the contact of said bar with said spots, substantially as described.

6. In a system of electrical distribution for railways, the combination, with a main conductor, its normally open-circuited branches, and rigidly-fixed exposed contact-spots, of electro-magnets energized by currents in parallel circuit with the motor, and the armatures of the magnets arranged to close the other circuit between the main conductor through said spots and through a traveling electromotor to the return-conductor, substantially as described, whereby the operation of said electro-magnets is independent of the changes of electrical conditions in said motor.

7. In a system of electrical distribution for railways having an insulated main conductor, a series of contact-spots rigidly fixed and distributed apart along the surface, and open-circuited branches adapted to connect said main conductor with said spots, the combination therewith of a series of automatically-operated inaccessible electro-magnetic switches included in circuits parallel with that of a traveling motor, the motor, and a contact-bar carried thereby, substantially as described, whereby said switches are adapted to be moved in one direction by the contact of said bar with one contact-spot and in the other direction by the rupture of its circuit consequent on a similar contact of the bar with the next spot in the direction of travel.

8. In a system of electrical distribution for surface railways, a traveling electromotor and an insulated main conductor, in combination with a series of rigidly-fixed surface-contacts and interposed circuit-controllers adapted to render connection between said main conductor and motor possible only at points immediately under the motor-car, all other surface-contacts before and behind the motor-car being inactive and without potential, substantially as described.

9. The combination, with the motor-car, of bar or shoe 14, arms 35, supporting the bar, and springs actuating the same, substantially as and for the purposes described.

10. In a system of electrical distribution for railways wherein the circuit to the motor is closed through the operation of electrically-controlled switches and opened thereby, the combination of the main conductor, its branches, electrically-controlled switches, and the motor-car, an electric-signal circuit on the car having a contact device in the rear of the main contact device, substantially as described, whereby said electric signal is adapted to operate upon the failure of said switches, or any of them, to open the motor-circuit at the required time.

In testimony whereof we have hereunto set our hands this 18th day of September, A. D. 1886.

WILLIAM J. McELROY.
JOHN D. NICHOLSON.

Witnesses:
THOMAS W. BAKEWELL,
W. B. CORWIN.